(12) United States Patent
Lingvall et al.

(10) Patent No.: US 9,446,374 B2
(45) Date of Patent: Sep. 20, 2016

(54) RESIDENCE TIME PLATE

(71) Applicant: ALFA LAVAL CORPORATE AB, Lund (SE)

(72) Inventors: Magnus Lingvall, Huddinge (SE); Kasper Höglund, Rönninge (SE)

(73) Assignee: ALFA LAVAL CORPORATE AB, Lund (SE)

( * ) Notice: Subject to any disclaimer, the term of this patent is extended or adjusted under 35 U.S.C. 154(b) by 0 days.

(21) Appl. No.: 14/376,255

(22) PCT Filed: Mar. 14, 2013

(86) PCT No.: PCT/EP2013/055206
§ 371 (c)(1),
(2) Date: Aug. 1, 2014

(87) PCT Pub. No.: WO2013/135799
PCT Pub. Date: Sep. 19, 2013

(65) Prior Publication Data
US 2015/0017080 A1 Jan. 15, 2015

(30) Foreign Application Priority Data
Mar. 14, 2012 (EP) .................................... 12159429

(51) Int. Cl.
*C10J 1/20* (2006.01)
*F28D 1/03* (2006.01)
(Continued)

(52) U.S. Cl.
CPC ................ *B01J 19/24* (2013.01); *B01J 19/249* (2013.01); *F28F 3/083* (2013.01); *F28F 3/12* (2013.01);
(Continued)

(58) Field of Classification Search
CPC ............. C10J 1/20; F28D 1/03; F25B 39/02; B01J 2219/245; B01J 2219/2451; B01J 2219/2453; B01J 2219/2454; B01J 2219/2455; B01J 2219/2456; B01J 2219/2458; B01J 2219/2459; B01J 2219/246; B01J 2219/2461; B01J 2219/2462; B01J 2219/2464; B01J 2219/2465
USPC ......................................... 422/602, 631, 311
See application file for complete search history.

(56) References Cited

U.S. PATENT DOCUMENTS 7,419,644 B2    9/2008  Chopard
9,073,031 B2 *  7/2015  Hoglund et al.
(Continued)

FOREIGN PATENT DOCUMENTS

CN    101300067 A    11/2008
CN    201240969 Y    5/2009
(Continued)

*Primary Examiner* — Huy-Tram Nguyen
(74) *Attorney, Agent, or Firm* — Birch, Stewart, Kolasch & Birch, LLP

(57) ABSTRACT

The present invention relates to a residence time plate comprising a stack of at least two substantially parallel and elongated flow chambers arranged such that the elongated side of each flow chamber lies next to the elongated side of a neighboring flow chamber and is separated by said neighboring chamber by a separation wall. Each separation wall has at least one through hole forming a communication between two neighboring flow chambers, and the through holes are arranged in the separation walls on alternating sides of an imaginary central line drawn through the stack of flow chambers such that the flow direction in a flow chamber is along the extension of the flow chamber and opposite the flow direction of a neighboring chamber. Moreover, the residence time plate comprises at least one liquid inlet and at least one liquid outlet arranged such that liquid flowing from said inlet to said outlet passes through the stack of flow chambers. Further, at least one flow-path enhancing insert is arranged in at least one flow chamber and forming a number of insert flow passages in said flow chamber, wherein the insert flow passages are arranged such that liquid flowing in the flow chamber is directed through said insert flow passages, thereby forming a zigzag flow path along the flow direction of the flow chamber.

20 Claims, 7 Drawing Sheets

(51) Int. Cl.
  *F25B 39/02* (2006.01)
  *B01J 19/24* (2006.01)
  *F28F 3/08* (2006.01)
  *F28F 3/12* (2006.01)
  *F28F 13/06* (2006.01)
  *F28F 13/12* (2006.01)

(52) U.S. Cl.
  CPC ............... *F28F 13/06* (2013.01); *F28F 13/12* (2013.01); *B01J 2219/2453* (2013.01); *B01J 2219/2462* (2013.01); *B01J 2219/2474* (2013.01); *B01J 2219/2479* (2013.01); *B01J 2219/2493* (2013.01); *B01J 2219/2496* (2013.01); *B01J 2219/2498* (2013.01); *B01J 2219/32296* (2013.01); *F28F 2250/04* (2013.01)

(56) References Cited

U.S. PATENT DOCUMENTS

| | | |
|---|---|---|
| 2002/0071797 A1 | 6/2002 | Loffler et al. |
| 2004/0109798 A1 | 6/2004 | Chopard et al. |
| 2006/0115393 A1 | 6/2006 | Reinke et al. |
| 2007/0071653 A1 | 3/2007 | Miyamoto et al. |
| 2008/0094802 A1 | 4/2008 | Kumagai et al. |
| 2008/0267845 A1 | 10/2008 | Hoglund et al. |
| 2010/0058663 A1 | 3/2010 | Son |

FOREIGN PATENT DOCUMENTS

| | | |
|---|---|---|
| CN | 101665241 A | 3/2010 |
| DE | 100 40 645 A1 | 6/2002 |
| EP | 1411315 A1 | 4/2004 |
| EP | 2 161 061 A1 | 3/2010 |
| EP | 2 402 077 A1 | 1/2012 |
| FR | 2 878 517 A1 | 6/2006 |
| FR | 2 880 106 A1 | 6/2006 |
| GB | 2 066 692 A | 7/1981 |
| JP | 50-47066 U | 5/1975 |
| JP | 51-151859 A | 12/1976 |
| JP | 57-204226 A | 12/1982 |
| JP | 58-23625 U | 2/1983 |
| JP | 62-160134 A | 7/1987 |
| JP | 2003-106785 A | 4/2003 |
| JP | 2003-207286 A | 7/2003 |
| JP | 2004-531379 A | 10/2004 |
| JP | 2007-90263 A | 4/2007 |
| WO | WO 02/42704 A1 | 5/2002 |
| WO | WO 2004/045761 A1 | 6/2004 |
| WO | WO 2006/072686 A1 | 7/2006 |
| WO | WO 2007/050013 A1 | 5/2007 |
| WO | WO 2008/066447 A1 | 6/2008 |
| WO | WO 2010/120234 A1 | 10/2010 |
| WO | WO 2010/130808 A2 | 11/2010 |

* cited by examiner

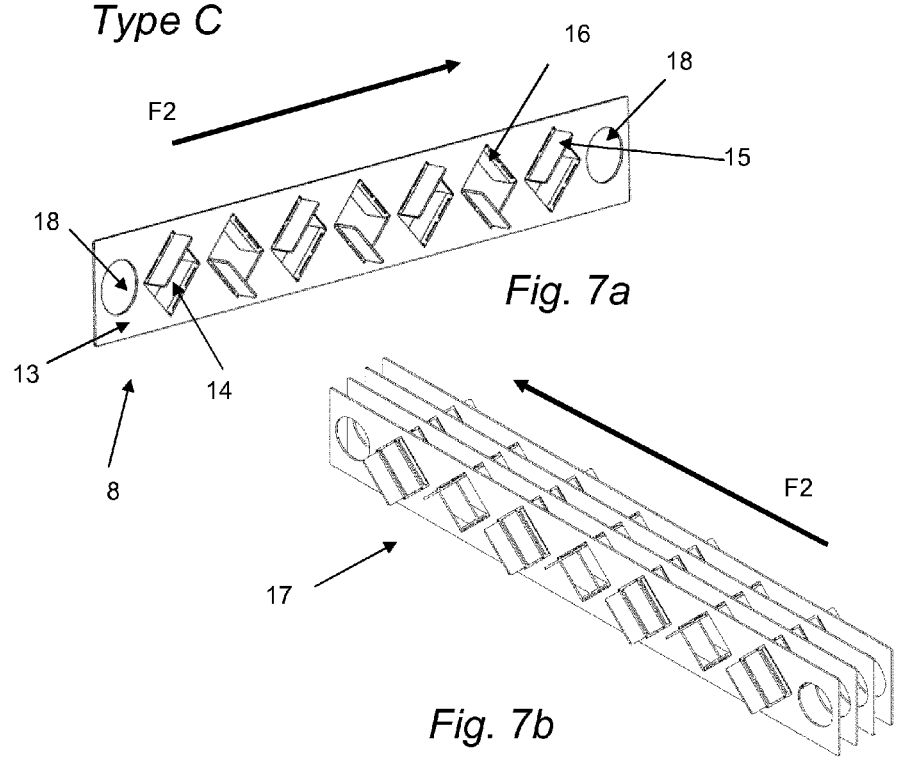
Fig. 7a
Fig. 7b
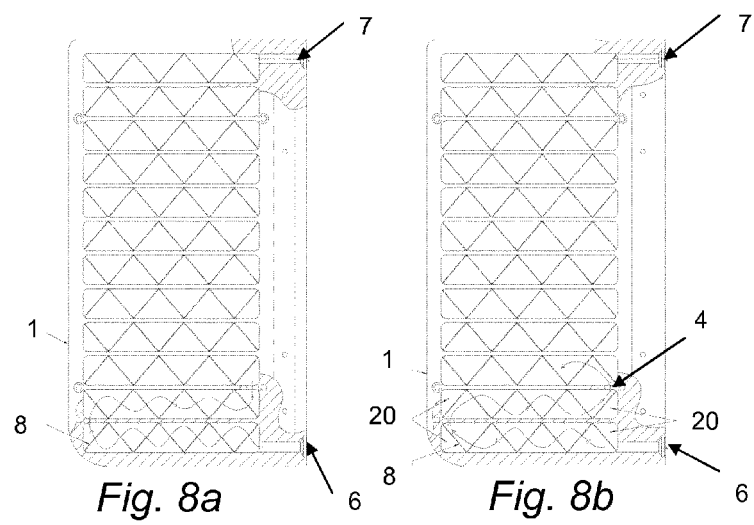
Fig. 8a   Fig. 8b

RESIDENCE TIME PLATE

FIELD OF THE INVENTION

The present invention relates to a residence time plate, an assembled residence time section, a flow module, and use of the flow module as a reactor for chemical reactions.

BACKGROUND

Many chemical reactions require long reaction times to complete. Batch reactors, due to thermal inefficiency and other drawbacks, have struggled to provide a solution. On the other hand, plate reactors, in which a continuous flow is integrated with advanced plate heat exchanger technology, may overcome some batch reactor limitations to enable safe, environmental and cost-effective process intensification. However, fitting or adapting the plate reactor to such chemical reactions may be costly. For continuous reactors, long residence time results in "long channels" with careful regulation of the process flow. A "long channel" in a plate reactor is costly and requires several plates and a lot of material for the production of the plates, because the reactor plates have a high cost per volume ratio. Furthermore, such "long" channels may make it difficult to facilitate adequate mixing or plug-flow characteristics of the plate reactor. Thus, there is a need in the art for improved types of reaction plates for plate reactors.

SUMMARY OF THE INVENTION

It is an object of the present invention to provide a reaction plate that overcomes or at least alleviates some of the problems encountered in the prior art.

As a first aspect of the invention, there is provided a residence time plate comprising
  a stack of at least two substantially parallel and elongated flow chambers arranged such that the elongated side of each flow chamber lies next to the elongated side of a neighboring flow chamber and is separated by the neighboring chamber by a separation wall,
  wherein each separation wall has at least one through hole forming a communication between two neighboring flow chambers, and wherein the through holes are arranged in the separation walls on alternating sides of an imaginary central line drawn through the stack of flow chambers such that the flow direction in a flow chamber is along the extension of the flow chamber and opposite the flow direction of a neighboring chamber,
  at least one liquid inlet and at least one liquid outlet arranged such that liquid flowing from the inlet to the outlet passes through the stack of flow chambers; and further
  at least one flow-path enhancing insert arranged in at least one flow chamber and thereby forming a number of insert flow passages in the flow chamber, wherein the insert flow passages are arranged such that liquid flowing in the flow chamber is directed through the insert flow passages, thereby forming a zigzag flow path along the flow direction of the flow chamber.

A residence time plate refers to a plate that is suitable for a continuous flow reactor.

A flow chamber refers to a three-dimensional chamber, such as having a three-dimensional rectangular shape. An elongated flow chamber may have a length or extension in one dimension that is longer than the length in the other dimensions. The stack of flow chambers refers to a stack in which the elongated flow chambers are arranged side by side with their elongated or longest side next to each other. The stack may comprise any number of flow chambers, such as at least 5 flow chambers, such as at least 10 flow chambers, such as at least 15 flow chambers. The flow chambers are arranged in the stack such that their longest sides are substantially parallel. The flow chambers may be of substantially equal dimensions an may be arranged next to each other such that a flow chamber is not displaced in relation to the neighboring chambers. The flow chambers are separated by the separation wall. Thus, one side of the separation wall may be in contact with one flow chamber whereas the other side of the wall is in contact with a neighboring flow chamber in the stack.

The separation wall has at least one through hole such that the stack of flow chambers are coupled in series, i.e. all chambers in the stack may in liquid contact if a liquid flows through the stack. If an imaginary straight line is drawn through the stack of chambers, such that the imaginary straight line is drawn through the center of each chamber, the through holes are arranged alternatively on one side of the line and alternatively on the other side of the line. Thus, in every second separation wall, the through hole is on the same side of the imaginary straight line. In other words, the through holes in the walls are alternating, either the through is on the right hand side of the imaginary straight line or the through hole is on the left hand side of the imaginary straight line. In this manner, a liquid flowing through the stack of chambers will have a first flow direction through one chamber and a second direction, which is opposite the first direction, in the neighboring chambers of the stack. The liquid may thus flow in an overall zigzag path when flowing through the stack from the inlet to the outlet. The through holes may be located in the separation wall so as to form the longest possible flow path. Thus, the through holes may be arranged close to the short ends of the elongated flow chamber so that liquid may flow substantially throughout the entire length of at least some of chambers, such as throughout the entire length of all chambers.

The liquid inlet and outlet may be located in the bottom and top flow chamber of the stack, respectively. Thus, the liquid inlet and liquid outlet may be arranged in the end chambers of the stack. Therefore, liquid flowing from the inlet to the outlet may pass through all flow chambers in the stack. The liquid inlet and/or outlet may be arranged at the shorter side of the elongated flow chambers, such as on the shorter sides of the bottom and top flow chamber, respectively.

A flow-path enhancing insert refers to an insert in the flow chamber that guides a liquid flowing in the chamber to follow a specific flow path. This flow path is thus longer than the flow path of a flow chamber that does not contain the flow-path enhancing insert. As an example, all flow chambers may comprise such an insert. When present in the flow chamber, insert flow passages are formed for the liquid flowing through the flow chamber. The insert passages are arranged such that the liquid takes a zigzag flow path along the flow direction of the flow chamber.

A zigzag flow path refers to a flow path in which the flow alternatively changes direction while following a general flow direction. Thus, the zigzag flow path may be a flow direction along a general line characterized by sharp turns in alternating directions. The zigzag flow path may be a two-dimensional zigzag flow path. By using Cartesian coordinates, the overall flow path from the inlet to the outlet may be described as a flow direction along a y-axis, i.e. the stack of flow chambers may extend along such a y-axis. In other words, the imaginary straight line through the stack of flow chambers may be in the y-direction. The overall flow direction in each chamber may be along an x-axis, i.e. in a direction that is perpendicular to the y-direction. Thus, the flow chamber may be elongated in the x-direction. Since the flow path is alternating in neighboring flow chambers, the flow path may be along positive x-axis in a flow chamber and along negative x-axis in a neighboring chamber. The zigzag pattern in a flow chamber may extend in two dimensions in a flow chamber. As an example, the zigzag pattern may extend in the plane formed by the x- and y axes. As a further example, the zigzag pattern in a flow chamber may extend in the plane formed by the x- and z-axis, in which z is the axis that is perpendicular to both the x and the y axis. In other words, the "thickness" or "depth" of a flow chamber may be in the z-direction, the length, i.e. the longest direction of the chamber, may be is in the x-direction, and the height of the chamber may be in the y-direction.

A residence time plate according to the first aspect of the invention is advantageous in that facilitates excellent heat transfer to a continuous reaction taking place in a liquid flowing through the residence time plate. Furthermore, the plate provides plug flow conditions for the liquid flowing through the flow chambers and at the same time provides for adequate mixing of liquid components. The residence time plate further provides for a less costly continuous flow reactor since to less material is needed in the plate. This may further give rise to a plate of less weight, which is easier to handle when a continuous flow reactor is assembled or dismantled.

In embodiments of the first aspect of the invention, the zigzag flow path extends in a plane that is not parallel to any enclosing wall or side of the flow chamber, Thus, with the Cartesian terminology used above, the zigzag pattern may extend in a plane that is tilted relative the xy-plane and the xz-plane, respectively.

In embodiments of the first aspect of the invention, the zigzag flow path extends in more than one plane, thereby forming a three-dimensional zigzag flow path along the flow direction of the flow chamber.

Consequently, with the Cartesian terminology used above, the zigzag flow path may extend in for example both the plane formed by the x and y axes and the plane formed by the x and z axis. In other words, the flow path may form a three-dimensional spiral-shaped flow path along the flow direction in a flow chamber. A three-dimensional zigzag flow path may thus be a flow path that changes direction in both the z and y direction when flowing along the x direction, wherein the x direction is the direction along the extension of the chamber. The flow path may thus form a coil-shaped flow path along the extension of the flow chamber. This is advantageous in that it allows for further heat transfer and mixing of the liquid while still providing plug-flow characteristics.

In embodiments of the first aspect of the invention, at least some insert flow passages are formed between the flow-path enhancing insert and any wall enclosing the flow chamber.

"Any wall" may be a separation wall described above or a wall perpendicular to the separation wall. As an example, the wall may be formed as the residence time plate is mounted in a continuous plate reactor. In embodiments, the residence time plate in itself further comprises such enclosing walls, i.e. walls perpendicular to the separation walls.

As an example, the flow path enhancing insert may comprise rectangular or quadratic baffles forming a zigzag pattern, wherein each baffle has two first parallel edges and two second parallel edges and wherein the zigzag pattern is formed by a first parallel edge of a baffle meeting a first parallel edge of a neighboring baffle such that an angle is formed between the second parallel edges of the neighboring baffles, and wherein the zigzag pattern extends along the direction of the elongated flow chamber such that the first edges are in contact with the separation walls, and further wherein two neighboring baffles meet at their first edges at an offset, thereby forming an alternating pattern in which every second baffle is shifted in a first direction along the first edge and the baffles in between are shifted in the opposite direction along the first edge, thereby forming the insert passages between the second edges of the baffles any wall enclosing the flow chamber.

The above specific embodiment is exemplified as the example denoted "Type A" in the detailed description and Figures.

Thus, the insert may be formed by quadratic or rectangular sections, or baffles, that form a zigzag pattern. The zigzag pattern is formed by two first edges of neighboring baffles meeting such that an angle is formed between the second edges of the neighboring baffles. This means that the second parallel edges of two neighboring baffles are tilted relative each other, such as tilted with angle β. This angle may be about 25 to 115°, such as about 90°. However, β may be constant throughout the zigzag pattern of baffles, i.e. every other baffle may be parallel with each other.

Furthermore, neighboring baffles meet each other at an offset in the direction along the first edge to form an alternating pattern. In this pattern, every other baffle is shifted relative the neighboring baffles. In other words, if an imaginary straight line is drawn through the center of all baffles, every other baffle is shifted in a first direction along an axis that is perpendicular to the straight line, and the baffles in between are shifted in a direction opposite this first direction.

Due to this shift, insert passages are formed between the second edges and the walls that enclose chamber when the plate is mounted in a plate reactor. These walls are thus parallel to the separation walls of the residence time plate. The inventors have found that this type of insert is advantageous in that it forces the liquid to take a "twisted" or almost spiral-shaped path along the direction of a flow chamber, i.e. a zigzag flow path that extends in more than one plane.

In embodiments of the first aspect of the invention, the flow-path enhancing insert comprises insert flow passages in itself. Thus, an insert may comprise through holes for the liquid flowing through the insert.

Furthermore, the insert may comprise baffles extending from the insert at at least some insert flow passages.

The baffles may extend from the surface of the insert. Such baffles may aid in guiding the liquid in a zigzag pattern. The baffles may be of any form, such as quadratic or rectangular. The baffles may extend such that they are perpendicular to the surface of an insert. At least some baffles and some flow passages may have the same dimensions.

As an example, the baffles and insert through passages may be arranged so as to guide the liquid in at least two different zigzag patterns along the flow direction of a flow chamber.

The at least two different zigzag patterns may be intertwining. This may further aid in mixing the liquid. Furthermore, the at least two different zigzag patterns may be in the same plane.

Consequently, the insert may be arranged so as to guide the liquid in two intertwining paths, so that each of those paths form a zigzag type pattern. These paths may be in the same plane or in different planes. This may for example be achieved when using baffles that, when inserted in a flow chamber, leave a passage between the end of the baffle and a wall of the flow chamber.

As an example, the insert may comprise an elongated sheet with a number of insert flow passages arranged in a row along the sheet, and wherein baffles extend from the sheet at the insert flow passages alternatively from a first side of the sheet and alternatively from a second side, which is opposite the first side, of the sheet.

The above specific embodiment is exemplified as the example denoted "Type B" in the detailed description and Figures. The inventors have found that such an insert guides the liquid to flow in two intertwining zigzag patterns, thereby facilitating a plug flow and mixing of the liquid.

The sheet may be a metallic sheet. The elongated sheet may be arranged in a flow chamber such that the elongated direction of the sheet is aligned with the elongated direction of the chamber. The insert flow passages and/or the baffles may have a quadratic or rectangular shape. The baffles may be tilted relative the flow direction of the flow chamber. Thus a normal to the surface of the baffle may form an angle with a vector aligned with the overall flow direction of a chamber.

The baffles may extend such that they are perpendicular to the side or surface of the sheet.

As an example, more than one baffle may extend from the insert at the flow passages. For example, at least two baffles may extend from each insert flow passage in opposite directions, and the baffles may be arranged such that the surface of the baffle is tilted relative the flow direction of the flow chamber.

The above specific embodiment is exemplified as the example denoted "Type C" in the detailed description and Figures. Thus, the flow may hit the baffle surface at an angle, i.e. a normal vector extending from the surface of the baffle may form an angle with the vector describing the flow direction in the flow chamber. The "opposite directions" may mean that the at least two baffles extend from an insert flow passage on different sides of the sheet. With the Cartesian terminology used above, the baffles may extend from the insert in positive and negative z-directions, respectively.

A flow chamber may comprise at least one insert according to the above embodiment "Type C". For example, a flow chamber may comprise at least two, such as three, inserts aligned next to each other so as to guide the liquid in an intricate zigzag pattern along the flow direction of the flow chamber.

In embodiments of the first aspect of the invention, the flow-path enhancing inserts are metallic foams or offset strip fin turbulators.

Thus, an insert may be constructed from a metallic sheet that may be folded to form a specific shape. Suitable inserts could for instance be metallic foams, folded sheet inserts, baffle ladder sheet inserts, stacked sheets inserts, offset strip fin turbulators or combinations thereof. The inserts may be for promoting mixing and plug flow.

Furthermore, the insert may be constructed from a sheet in which through passages are created, and the sheet material that prior used to cover these passages may form baffles. Thus, the through passages and the baffle may have the same shape. Consequently, if for example the through passages are to be quadratic or rectangular, the through passages and baffles may be constructed by, for each through passage, cutting the sheet along three sides of the quadrat or rectangle and then folding out a baffle along the fourth side, thereby creating a through passage and a baffle extending from the insert at the through passage. This is further illustrated in e.g. FIG. 6 of the present disclosure (see the detailed description below).

In embodiments of the first aspect of the invention, the flow-path enhancing inserts are coated with at least one catalyst. As an example, the insert may be a metallic foam and the foam may be coated with at least one catalyst. The catalyst may be a catalyst for the reaction taking place in the flow chamber.

In embodiments of the first aspect of the invention, the at least one through hole between flow chambers has a net for enhancing the mixing of a liquid passing the at least one through hole.

Furthermore, the residence time plate could also comprise one or more access ports or one or more port holes, or combinations thereof, for providing access to the chambers and to the process flow when the residence time plate is in use.

As a second aspect of the invention there is provided an assembled residence time section comprising a residence time plate according to the first aspect of the invention arranged between two utility plates, wherein the utility plates form two opposite walls of the flow chambers, wherein the walls are perpendicular to the walls formed by the separation walls between the flow chambers.

Thus, if the shape of the flow-path enhancing insert is such that at least some insert flow passages are formed between the flow-path enhancing insert and any wall enclosing the flow chamber, such flow passages could be formed between the insert and the part or surface of a utility plate that faces the flow chamber.

As an example, at least one utility plate may comprises a stack of a utility connection plate, a turbulator plate, a turbulator frame plate, an O-ring, a heat transfer plate and a utility frame plate.

Furthermore, the residence time plate may be fitted in the utility frame plate and the heat transfer plate may form one of the opposite walls of the flow chambers.

Moreover, the utility side may be closed by O-rings and barrier plates. In the utility conduit a turbulator plate may be located. The conduit may have two ports for inlet or outlet of heat transfer fluid. At both ends there may be a connection port. The connection ports may be designed to hold plugs, thermocouples or other equipment.

Consequently, the assembled residence time section may comprise a residence time plate and two utility plates. A utility flow or the heat transfer fluid may be divided to flow through the two utility plates, one stream on each side of the residence time plate, and could be collected at the outlet. Process and utility sides could thus be totally separated, and there may be no interfaces with seals between the fluids, e.g. all seals could be faced towards atmosphere. The seals may be separated by a heat transfer plate which forms a part of the utility plate. The residence time plate could be closed with a utility plate on each side. Gaskets could be sealing the residence time plate in the utility frame plate of the at least one utility plate.

The process side, i.e. the residence time plate, may be closed by an expanded PTFE gasket, against the heat transfer plate. As an example, the process flow channel may be created in the residence time plate by an insert with baffles. The channel may be connected to an inlet port and an outlet port. There could be several access ports to the channel and the access ports may be machined in the same plate.

The use of the residence time plates could be for the mixing and heat transfer between liquid flows through the plate. The plate may be used together with a frame where the plates may be stacked together with other plates having other functions.

As a third aspect of the invention, there is provided a flow module, comprising one or more assembled residence time sections according to the second aspect of the invention and a clamping device, which clamping device comprises a frame and two end plates between which the residence time sections are arranged.

The flow module could be a plate reactor, such has a continuous flow plate reactor.

Furthermore, the flow module may comprise disc springs and tension rods. For example piles of disc springs may be arranged as a grid of springs supported on end plates to distribute clamping forces on residence time plates, which residence time plates may be placed between the two end plates.

The frame could be designed to give sufficient clamping force, and pressure distribution, over the sealing surface to secure safe operation.

The assembled residence time sections may be stacked onto each other in a reactor frame and they may be assembled and clamped in the frame to seal and hold pressure. The assembled residence time sections may be stacked individually or in combination with other plates. The purpose defines the configuration to suit the intended process.

The process flow channel may be shaped to induce vortices which frequently reverse direction. This provides mixing of the flow, even though the flow may be in the laminar regime, which is an essential requirement for plug flow, good reaction rates and heat transfer. The utility flow conduit could be equipped with a turbulator plate that generates vortices in the flow which helps to transport heat to and from the wall to the fluid flow.

Moreover, the flow module may also comprise one or more flow plates. Such a flow plate may be dividable in mid plane, and may comprise two parts, each part comprising a channel side and a utility side. The two parts of the flow plate may be counter parts and mirroring each other. When connected together, the two parts may form a channel between the two counter parting channel sides. The channel may comprise curved obstacles, sidewalls and channel floors. The curved obstacles may be lined up in parallel rows separated by sidewalls. The backside of the rows of curved obstacles may have grooves making the obstacles hollow for heat transfer fluids on the utility sides.

As a fourth aspect of the invention, there is provided the use of a flow module according to the third aspect as a reactor for chemical reactions.

The flow module or a residence time plate of the present invention may be useful when undertaking the following process operations; manufacturing, reactions, mixing, blending, doing cryogenic operations, washing, extractions and purifications, pH adjustment, solvent exchanges, manufacturing of chemicals, manufacturing of intermediate chemicals, manufacturing API (active pharmaceutical ingredients) when working with low temperature operations, manufacturing of pharmaceutical intermediates, scale-up and scale-down developments, precipitation or crystallisations, performing multiple injections or multiple additions or multiple measurements or multiple samplings, working with multistep reactions, pre-cooling operations, preheating operations, post-heating and post-cooling operations, processes for converting batch processes to continuous processes, and operations for dividing and recombining flows.

Reaction types which can be performed by the flow module or a residence time plate of the present invention include addition reactions, substitution reactions, elimination reactions, exchange reactions, quenching reactions, reductions, neutralisations, decompositions, replacement or displacement reactions, disproportionation reactions, catalytic reactions, cleaving reactions, oxidations, ring closures and ring openings, aromatization and dearomatization reactions, protection and deprotection reactions, phase transfer and phase transfer catalysis, photochemical reactions, reactions involving gas phases, liquid phases and solid phases, and which may involve free radicals, electrophiles, neucleophiles, ions, neutral molecules, etc.

Synthesis such as amino acid synthesis, asymmetric synthesis, chiral synthesis, liquid phase peptide synthesis, olefin metathesis, peptide synthesis, etc. may also be carried out with the flow module or residence time plate. Other types of synthesis in which the flow module can be used are reactions within carbohydrate chemistry, carbon disulfide chemistry, cyanide chemistry, diborane chemistry, epichlorohydrin chemistry, hydrazine chemistry, nitromethane chemistry, etc. or synthesis of heterocyclic compounds, of acetylenic compounds, of acid chlorides, of catalysts, of cytotoxic compounds, of steroid intermediates, of ionic liquids, of pyridine chemicals, of polymers, of monomers, of carbohydrates, of nitrones etc.

The flow module or residence time plate is suitable for name reactions such as Aldol condensations, Birch reductions, Baeyer-Villiger oxidations, Curtius rearrangements, Dieckmann condensations, Diels-Alder reactions, Doebner-Knoevenagel condensations, Friedel-Crafts reactions, Fries rearrangements, Gabriel synthesis, Gomberg-Bachmann reactions, Grignard reactions, Heck reactions, Hofmann rearrangements, Japp-Klingemann reactions, Leimgruber-Batcho indole synthesis, Mannich reactions, Michael additions, Michaelis-Arbuzov reactions, Mitsunobu reactions, Miyaura-Suzuki reactions, Reformatsky reactions, Ritter reactions, Rosenmund reductions, Sandmeyer reactions, Schiff base reductions, Schotten-Baumann reactions, Sharpless epoxidations, Skraup synthesis, Sonogashira couplings, Strecker amino acid synthesis, Swern oxidations, Ullmann reactions, Willgerodt rearrangements, Vilsmeier-Haack reactions, Williamson ether synthesis, Wittig reactions etc.

Further reactions which the flow module or residence time plate is suitable for are condensation reactions, coupling reactions, saponifications, ozonolysis, cyclization reactions, cyclopolymerization reactions, dehalogenations, dehydrocyclizations, dehydrogenations, dehydrohalogennations, diazotizations, dimethyl sulphate reactions, halide exchanges, hydrogen cyanide reactions, hydrogen fluoride reactions, hydrogenation reactions, iodination reactions, isocyanate reactions, ketene reactions, liquid ammonia reactions, methylation reactions, coupling, organometallic reactions, metalation, oxidation reactions, oxidative couplings, oxo reactions, polycondensations, polyesterifications, polymerization reactions, other reaction such as acetylations, arylations, acrylations, alkoxylations, ammonolysis, alkylations, allylic brominations, amidations, aminations, azidations, benzoylations, brominations, butylations, carbonylations, carboxylations, chlorinations, chloromethyl-ations, chlorosulfonations, cyanations, cyanoethylations, cyano-methyl-lations, cyanurations, epoxidations, esterifications, etherifications, halogenations, hydroformylations, hydrosilylations, hydroxylations, ketalizations, nitrations, nitro-methylations, nitrosations, peroxidations, phosgenations, quaternizations, silylations, sulfochlorinations, sulfonations, sulfoxidations, thiocarbonylations, thiophosgenations, tosylations, transaminations, transesterifications, etc.

Other aspects and advantages of the invention will, with reference to the accompanying drawings, be presented in the following detailed description of embodiments of the invention. The below figures are intended to illustrate the invention and are only examples of the invention, and as such not to limit the scope of the invention.

BRIEF DESCRIPTION OF THE DRAWINGS

FIG. 7 shows a flow-path enhancing insert of "type C".
FIG. 8 shows two alternatives of a residence time plate having flow path enhancing inserts.

DETAILED DESCRIPTION

Figure 1:
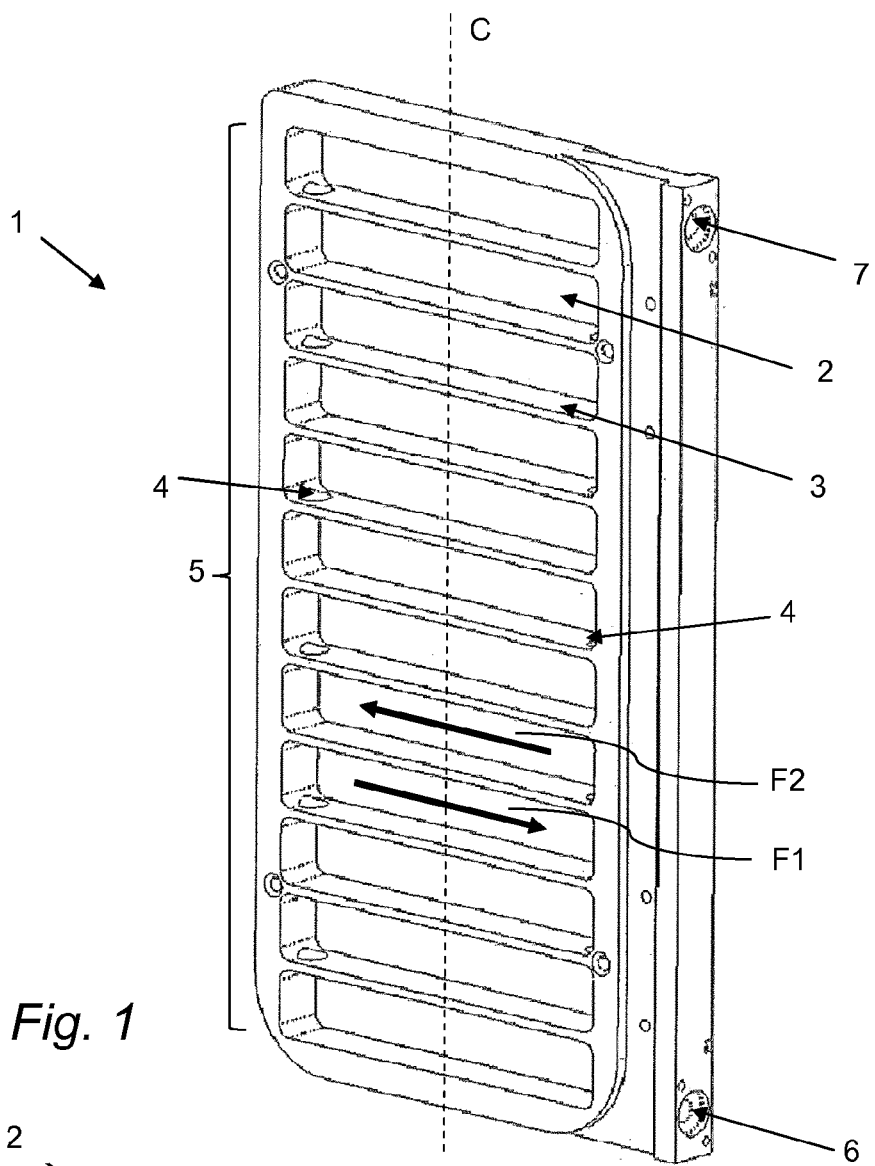
FIG. 1 shows a residence time plate without any flow-path enhancing insert.

FIG. 1 shows a residence time plate 1 without any flow path enhancing inserts. The plate 1 comprises a stack 5 of elongated flow chambers 2. The flow chambers 2 are arranged in the stack 5 such that their longest sides face each other, i.e. their longest sides lay side-by-side. The separation walls 3 separate the flow chambers from each other and comprises through holes 4 such that the flow chambers of the entire stack are in communication. The through holes 4 are arranged on alternating sides of imaginary straight line C drawn through the center of the stack and through all flow chambers 3. As seen in FIG. 1, when the stack is seen from the side, the through holes are alternating on the left and right hand side of line C. Furthermore, in this case, the through holes are arranged as far away as possible from central line 4 but still in the separation wall 3 that separates flow chambers 2 from each other, such that liquid flowing in the stack will flow substantially through the entire length of each chamber 2. Thus, liquid flowing through the stack 5 will have a flow direction F1 in a flow chamber 2 and a flow direction F2, which is opposite F1, in neighboring flow chambers 2. The residence time plate 1 further has an inlet 6 and an outlet 7, arranged on the bottom and top flow chambers 2 of the stack 1. The inlet 6 and outlet 7 are arranged on a wall that is perpendicular to the separation walls and farthest away from the through hole 4 connecting the bottom chamber with its neighboring chamber and the top chamber with its neighboring chamber, respectively. Thus, liquid flowing from the inlet 6 to the outlet 7 will pass the entire length of the bottom and top flow chambers 2, respectively. In this case, the liquid will pass through all flow chambers 2 of the stack 5 when flowing through the inlet 6 to the outlet 7. One or more port holes or access ports could also be included in residence time plate 1 for access from the outside. However, this is not shown in FIG. 1.

Figure 2:
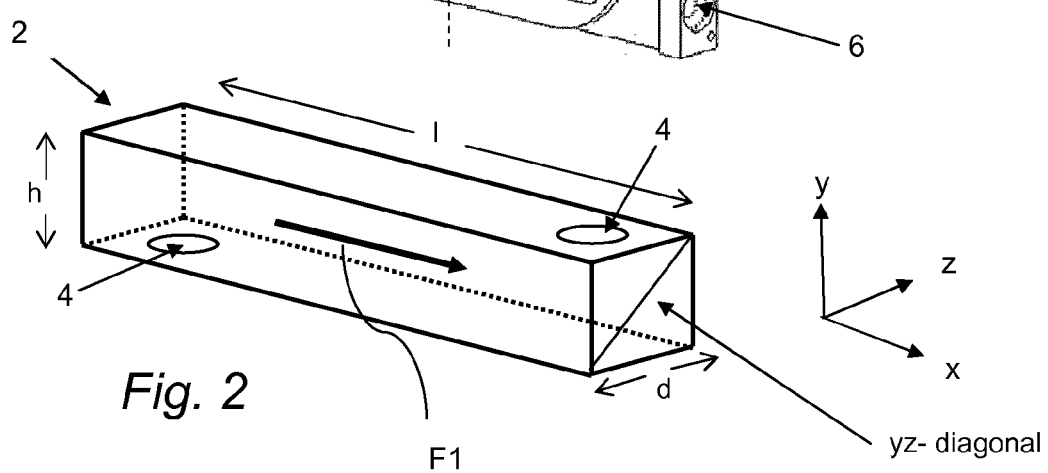
FIG. 2 shows a flow chamber of a residence time plate.

As shown in FIG. 2, a flow chamber 2 may have the form of a three-dimensional rectangle with length l, height h and depth d. A Cartesian coordinate system is also drawn in FIG. 2. Thus, the flow chamber has its longest dimension in the x-direction. Consequently, using this coordinate system, the overall flow path through the stack, i.e. from the inlet to the outlet, is in the y-direction, wherein the y-direction is perpendicular to the x-direction, whereas the flow path in single flow chambers are in alternating positive or negative x-directions. Through holes 4 are located at the end of the flow chambers, i.e. within the flow chamber 2 and as close to the side walls defined by the height h and depth d of a flow chamber.

A residence time plate further has flow-path enhancing inserts so as to guide the flow in at least one flow chamber 2 in a zigzag-pattern along the flow direction F1 or F2. The zigzag pattern may be in the plane as defined by the x and y axes, i.e. in the xy-plane, or it may be in the plane as define by the x and z axes, i.e. in the xz-plane. However, the zigzag flow pattern may further be in a plane that is tilted relative the xy-plane and/or the xz-plane. As an example, the flow path may form a zigzag pattern in the plane defined by the yz-diagonal, as shown in FIG. 2. However, the insert may further be arranged such so as to guide the liquid in at least two intertwining zigzag patterns. This means that the insert may be arranged to "split" the flow in different zigzag patterns. These split zigzag patterns may extend in the same plane, such as the xz or xy-planes, or they may be in different planes. Furthermore, the insert may be arranged so as to guide the flow of liquid in a zigzag pattern that extends in more than one plane, such as in a three-dimensional zigzag pattern or three-dimensional spiral-shaped pattern, along the extension or flow direction of a flow chamber.

Figure 3:
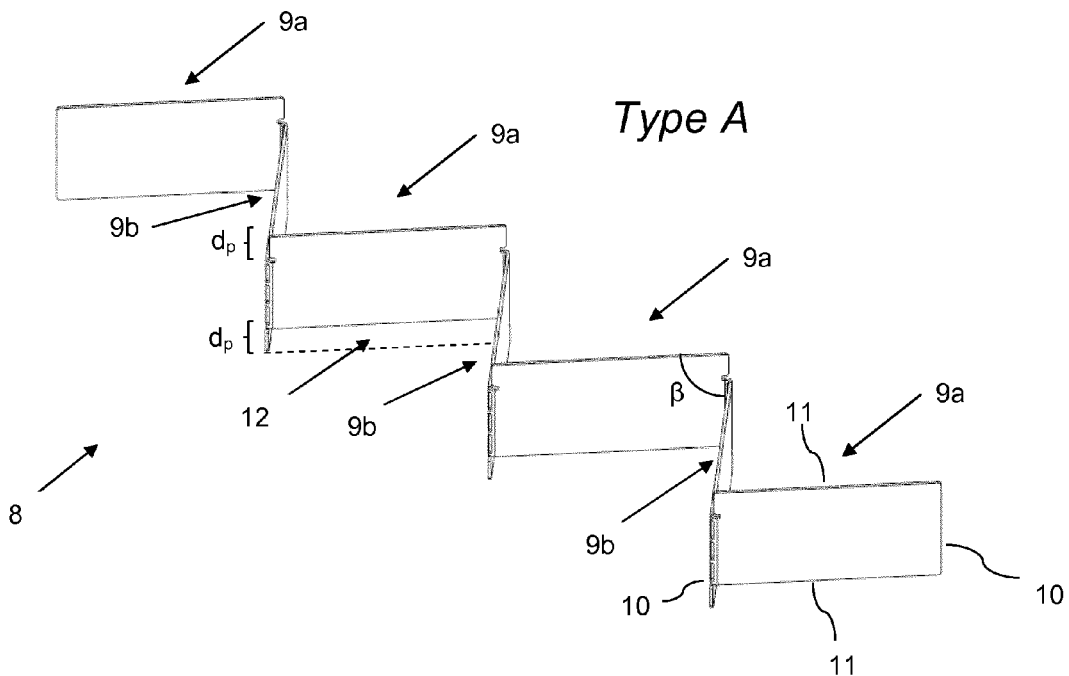
FIG. 3 shows a flow-path enhancing insert of "type A".

FIG. 3 shows a flow path enhancing insert 8 according to an embodiment. This type is referred to as "Type A". The insert 8 comprises a number of rectangular baffles 9a, 9b that form a zigzag pattern. Each baffle 9a, 9b has two first parallel edges 10 and two second parallel edges 11. The zigzag pattern is formed by a first edge 10 of a baffle 9a meeting a first edge 10 of a neighboring baffle 9b so as to form an angle β between the baffles, i.e. such that an angle β is formed between the second edge of a baffle and a second edge of a neighboring baffle. The zigzag pattern may be regular, i.e. β may be constant throughout the insert 8. In the example shown as "Type A", β is about 90°. Furthermore, a baffle 9a meets a neighboring baffle 9b at an offset such that an alternating pattern of shifted baffles is formed. This means that a first edge 10 of a baffle is shifted relative the edge 10 of a neighboring baffle along the line or direction formed by the first edges. In other words, where two baffles 9a and 9b meet, an offset distance $d_p$ is formed, i.e. a distance of a first edge 10 of a baffle that is not in contact with the first edge of a neighboring baffle. Thus, every second baffle 9a are shifted in a first direction along the line or direction defined by meeting edges 10, whereas the baffles 9b in between are shifted in a second direction along the line or direction defined by meeting edges 10, wherein the second direction is opposite the first direction. As an example, the offset distance $d_p$ may be about 10-50% of the distance of the first edge 10 of a baffle, such as about 25% of the distance of the first edge 10 of a baffle.

Figure 4:
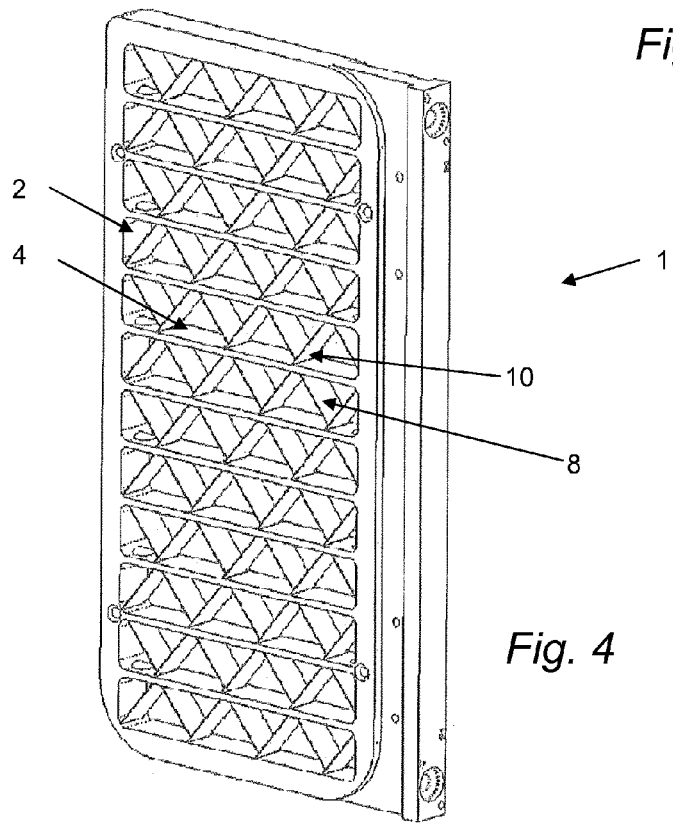
FIG. 4 shows the insert of FIG. 3 when arranged in the residence time plate.

FIG. 4 further shows a residence time plate with baffles 8 arranged in the flow chambers 2. The inserts 8 are arranged such that the first edges 10 are in contact with the separation walls 4 of the residence time plate 8. Since the insert is an alternating pattern in which every second baffle is shifted in relation to the neighboring baffle as describe above, insert flow passages 12 are formed between a second edge 11 of a baffle and a wall that encloses the flow chamber, i.e. a wall that is perpendicular to the separation walls 4. With reference to FIG. 2, flow passages 12 are formed between second edges 11 and the wall that encloses the flow chamber in the xy-plane. Since first edges 10 are in contact with separation wall 4, this means that the distance of a first edge plus the offset distance $d_p$ may be equal to the depth of a flow chamber, i.e. equal to distance d as shown in FIG. 2. When inserting the insert 8 of type A in flow chambers 2, it may be useful to arrange the insert 8 such that it does not create any "dead volume" next to an inlet or outlet of the residence time plate (see further FIGS. 8a and 8b discussed below).

Figure 5:
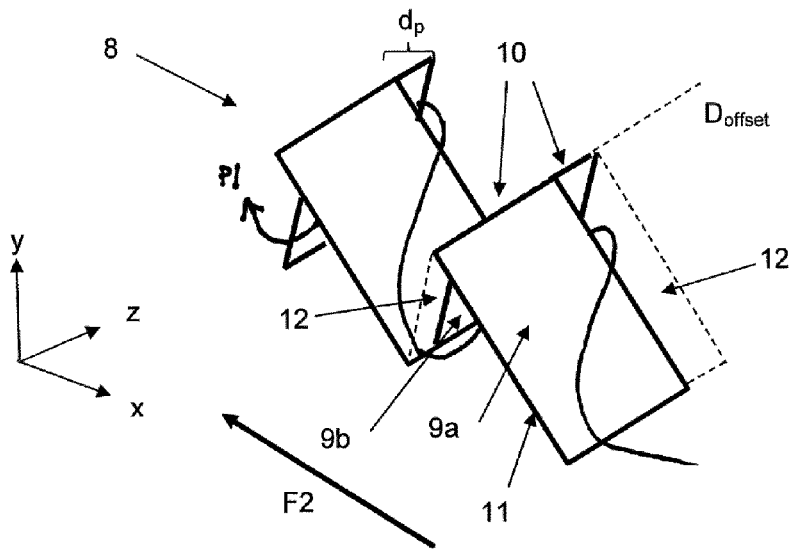
FIG. 5 further shows a flow-path enhancing insert of "type A".

FIG. 5 further illustrates how the insert 8 of Type A, when arranged in a flow chamber, may guide a liquid along flow path P1 in the overall flow direction F2 of the flow chamber. As discussed above, since the first edges 10 of two neighboring baffles 9a, 9b meet at an offset, i.e. is shifted relative each other with distance $d_p$ along direction $D_{offset}$, insert passages 12 are formed between the second edges 11 and walls of the flow chamber. The insert passages 12 may thus be formed between edges 11 and the walls enclosing the chamber in the xy-plane. As seen in FIG. 5, theses passages are on opposite sides of baffles 9a as compared to neighboring baffles 9b. As a liquid flow in flow direction F2, the insert 8 may guide the liquid to take a path through the flow chamber as schematically described by flow path P1. This flow path P1 may be described as a zigzag pattern in more than one plane. In this case, it forms a pattern like a three dimensional spiral that extends along flow direction F2, i.e. along the length l of a flow chamber. Thus, the liquid coils around the insert 8 as liquid is guided in flow direction F2. An inset according to Type A facilitates a plug flow and provides for excellent mixing of the liquid as it is guided through the residence time plate 1.

Figure 6:
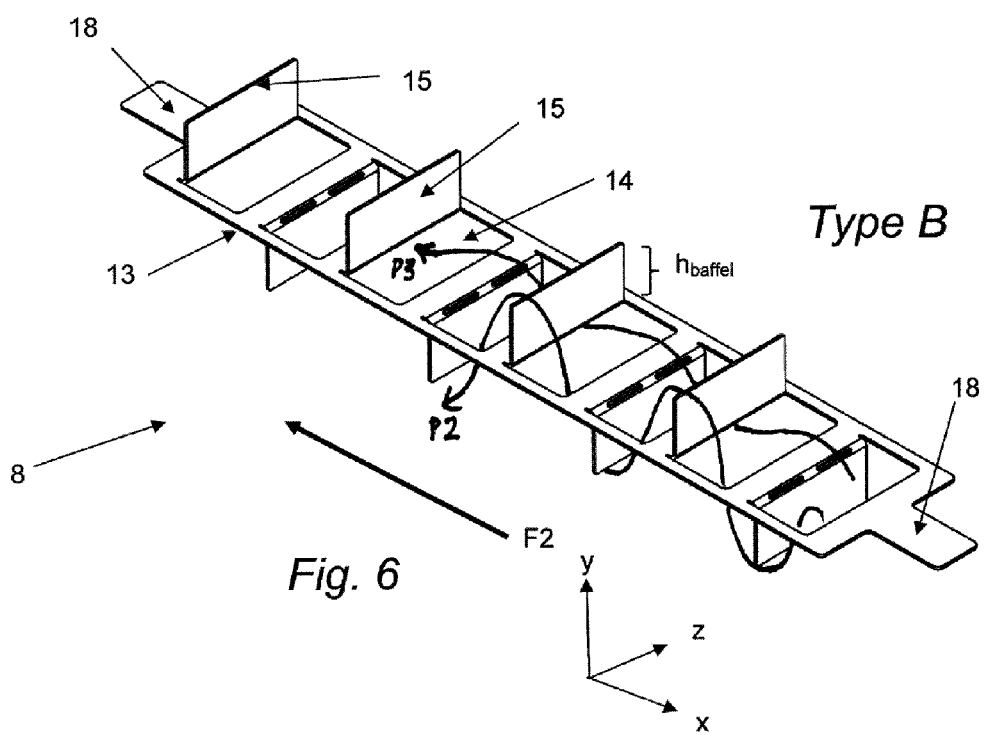
FIG. 6 shows a flow-path enhancing insert of "type B".

FIG. 6 shows another embodiment of an insert referred to as "Type B". This insert 8 comprises an elongated sheet 13 in which through holes 14 have been formed. At each through hole, a rectangular baffle 15 extends from the sheet 13. The baffles 15 extend in a direction that is about perpendicular to the surface of, or the plane formed by, the sheet 13. The through holes 14 are also rectangular and are about the same size as a baffle 15. When arranged in a flow chamber 2, the insert may guide a liquid along flow paths P2 and P3, i.e. along two intertwining zigzag-shaped flow paths, when flowing along flow direction F2 of a flow chamber. In this case, the two intertwining flow paths P2 and P3 form individual zigzag patterns in the same plane, which is in FIG. 6 illustrated as the xy-plane. The flow path P2 has larger amplitude in the xy-plane as compared to flow path P3. Depending on the orientation of the insert 8 in a flow chamber, P2 and P3 could form intertwining zigzag patterns in the xy-plane or the xz-plane. Thus, the surface of sheet 13 could be parallel to the xz-plane, as shown in FIG. 5, or be parallel to the xy-plane if the insert 8 is rotated 90 degrees. In other words, the height $h_{baffle}$ of a baffle may be such that it allows liquid to pass between the baffle and a chamber wall, such as the chamber wall defined by the depth d and length l of a chamber, i.e. a wall in the xz-plane, or the chamber wall defined by length l and height h, i.e. a wall in the xy-plane. In other words, $h_{baffle}$ may be less than half of distance d or less than half of distance h. Securing parts 18 may be used for securing insert 8 within a chamber 2 and may further promote the process flow into or out of chambers 2. An inset according to Type B facilitates a plug flow and provides for excellent mixing of the liquid as it is guided through the residence time plate 1.

FIG. 7a shows another embodiment of a flow-path enhancing insert 8, referred to as "Type C". The insert 8 comprises an elongated sheet 13 having a number of insert flow passages 14 arranged in a row along the extension of the sheet 13. At least some of the flow passages 14 have a quadratic shape aligned so that their diagonals are substantially parallel to the flow direction F2 of a flow chamber. Two baffles 15 and 16 extend from each flow passage 14 in opposite directions. Thus, baffle 15 extends perpendicularly from the sheet 13 in a first direction whereas baffle 16 extends from the sheet 13 perpendicularly from the opposite side of the sheet 13, i.e. in a direction that is opposite the direction of baffle 15. Baffles 16 are shaped as rectangles having their longest sides equal to a side of the through passage 14. The baffles 15 and 16 may be of the sheet material and may have been folded out from the sheet when producing the through passages 14. The baffles 15 and 16 of a through passage are in this case parallel to each other but extend in opposite directions from the sheet 13. The baffles 16 are tilted relative the flow direction F2, i.e. a normal vector to the surface of a baffle form an angle with the flow direction F2. Furthermore, baffles 16 on one side of the sheet 13 are alternatively tilted in a first tilted direction and alternatively in a second tilted direction, which is opposite the first tilted direction. Thus, a baffle is tilted perpendicularly relative a baffle that is on the same side of sheet 13 and extends from a neighboring through passage 14. Furthermore, if a straight line is drawn through the center of the sheet 13 and through the center of all through passages 14, the baffles arranged on the same side of the sheet are arranged alternatively above and below the line throughout the row of through passages. Securing parts 18, in this case in the form of circular hole, may be used for securing insert 8 within chambers 2 and may further promote the process flow into or out of chambers 2. An insert of Type C may guide a liquid in several intertwining zigzag patterns.

As seen in FIG. 7b, the inserts 18 may be put next to each other so as to form a stack 17 of inserts. Thus, each chamber may comprise several, such as two, three or four, inserts of Type C stacked together. This may further promote mixing of the liquid. The flow path through the stack 17 of Type C inserts may form several intertwining zigzag patterns.

FIGS. 8a and 8b show the importance of the orientation of the baffles of the folded sheet inserts 8. A first orientation of insert 8 may create a process flow conduit as seen in FIG. 8a. A second orientation of insert 8 may however create "dead" volumes 20 in the flow path as seen in FIG. 8b. Since folded sheet inserts 8 may comprise baffles, it is important that there is enough space for the incoming process fluids at the inlet 6 of residence time plate 1 and that the insert 8 does not block the incoming fluid. In analogy, also at the through holes 4 in separation walls 3, the first orientation shown in FIG. 8a may increase the flow characteristics as compared to the second orientation shown in FIG. 8b.

Figure 9:
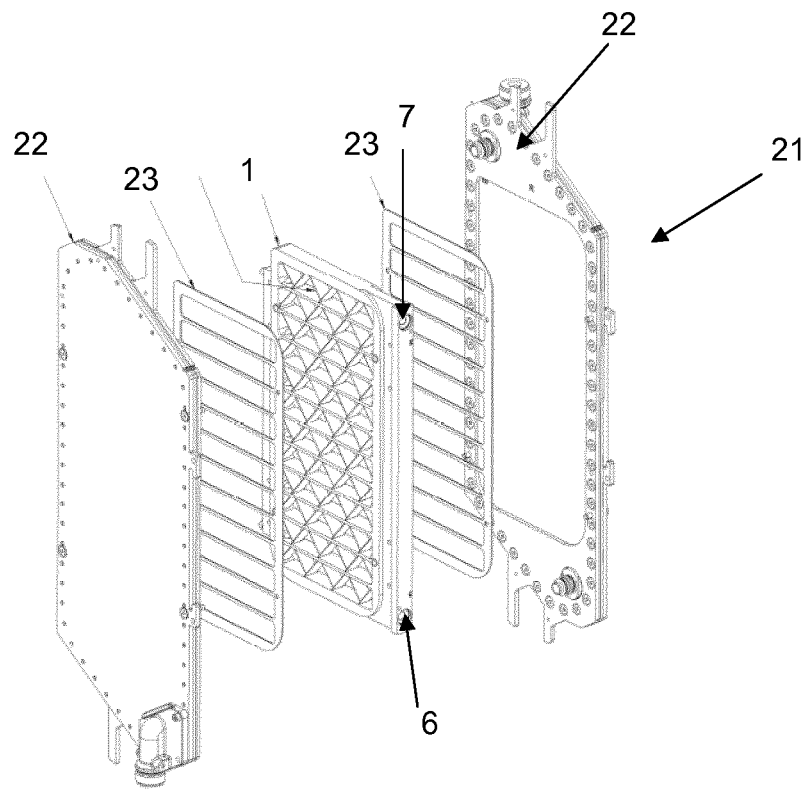
FIG. 9 shows a blown apart part view of a residence time section.

FIG. 9 shows a blown apart part view of a residence time section 21. Residence time section 21 comprises residence time plate 1 and two utility plates 22. Utility plates 22 are arranged on each side of residence time plate 1 and when in use the utility plates are cooling or heating the flow of the process fluids. Two gaskets 23 are sealing the flow conduit of residence time plate 1, one on each side when residence time section 21 is assembled. The assembled residence time sections may be stacked onto each other in a reactor frame or assembled residence time sections may be stacked onto other flow sections having other purposes. The assembled residence time sections may be assembled and clamped in the frame to seal and hold pressure (not shown in FIG. 7).

Figure 10:
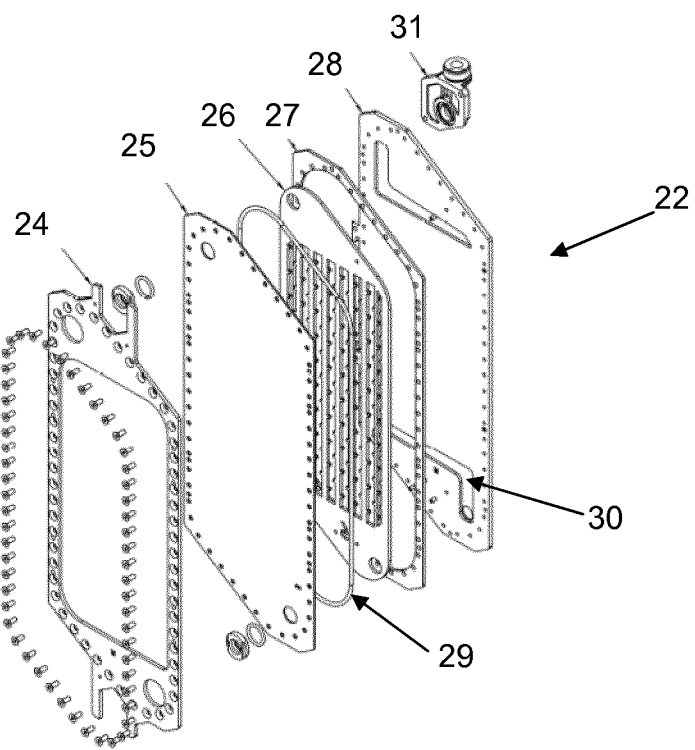
FIG. 10 shows a blown apart part view of a utility plate.

FIG. 10 is shows a blown apart part view of a utility plate 22. Utility frame plate 24 is the part which residence time plate 1 may be fitted into, (not shown in the FIG. 8). A heat transfer plate 25 is a barrier between residence time plate 1 and the heat exchanger side of utility plate 22. On the heat exchanger side of utility plate 22 there is a turbulator plate 26 for enhancing the heat transfer within the utility plate. Turbulator plate 26 is placed in a turbulator frame 27 on top of utility connection plate 28. The utility plate is sealed by an O-ring 29 on the heat exchanger side of the utility plate and O-ring 29 is placed around the circumference of turbulator plate 26. On utility connection plate 28 is two cut open parts 30 for distribution of utility fluids to utility plate and utility connection pieces 31 are inlets and outlets for utility fluids.

Figure 11:
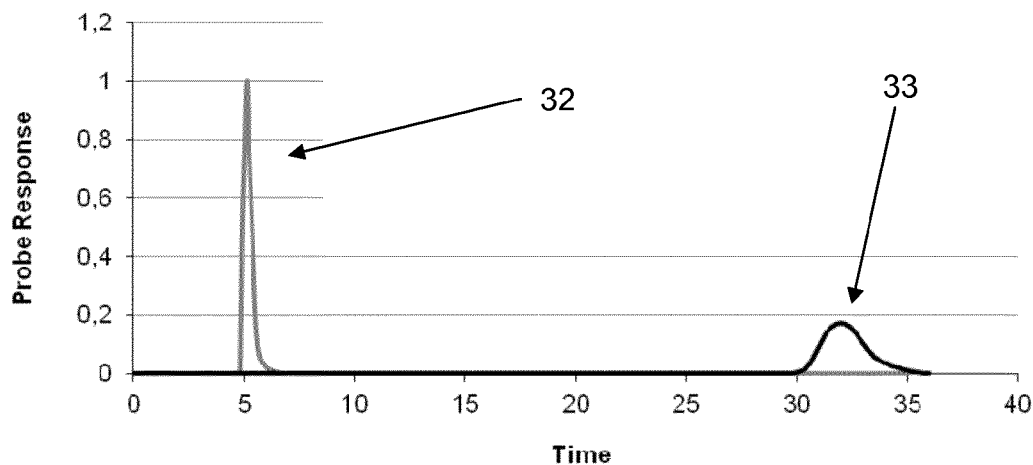
FIG. 11 shows a Plug Flow-Residence Time Distribution.

FIG. 11 shows Plug Flow-Residence Time Distribution of a flow module comprising a residence time plate according to the present disclosure. The residence time plate of the flow module was equipped with a flow path enhancing insert of type A. The measured residence time distribution peaks are indicative of the plug flow behavior of the flow module. A residence time measuring equipment was fitted to the inlet and outlet of the flow module. The 'pulse' method resulted in sharp peak 32 for the injected medium measured at the inlet and a single smooth outlet curve 33 with a narrow distribution measured at the outlet, which is seen in the FIG. 11. The size and shape of the curve is dependent upon the design of the flow path, the method of measurement, the concentration and the shape of the inlet curve. The narrow distribution of the outlet curve 33 indicates little axial dispersion of the injected fluid and hence good plug flow. Multiple peaks or peaks prior to or after the main curve may indicate bypassing. This might occur if a gasket is broken or when the reactor is configured with parallel flow paths.

Figure 12:
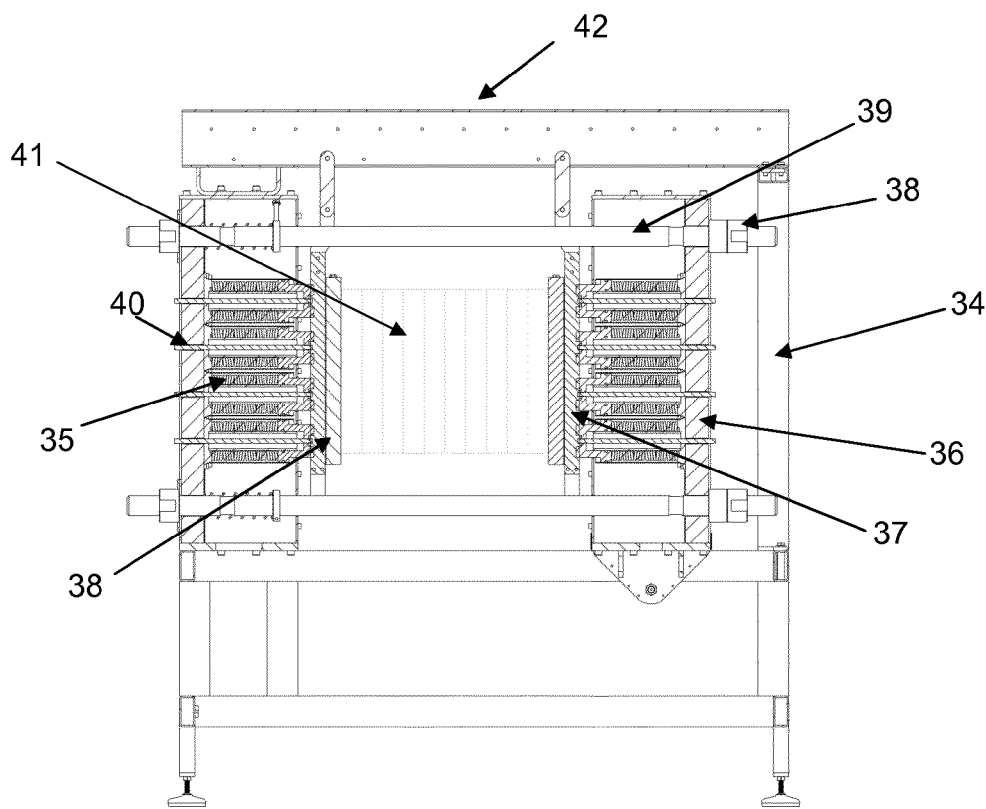
FIG. 12 shows a flow module.

FIG. 12 shows a flow module, in this case a plate reactor 42, according to the present disclosure. The reactor 42 comprises a clamping device which in turn comprises a stack 41, frame 34, grids of springs 35 and end plates 36. The stack 41 includes at least one assembled residence time section held into place within frame 34. Frame 34 is holding stack 41 into place between two distribution plates 37 together with two pressure plates 38 between two end plates 36. Residence time sections could be arranged in stack 41 and be compressed by aid of hydraulic cylinders tensioning the tension rods. Residence time sections may further be kept in place by the force from grids of springs 35 and end plates 36. The nuts 38 could be tightened and the force from hydraulic cylinders could be released. The two end plates 36 are positioned so that a number of residence time sections can be arranged between them when in open position. The distance between end plates 36 may be adjusted by choosing the number of sleeves and tightening of nuts 38 on one end of each tension rod 39. Residence time sections could be combined in stack 41 with other types of flow plates within the clamping device. As an example, reaction plates, having inlets for reactants in a chemical reaction, could form a part of the stack 41. Furthermore, flow plates could also form part of stack 41. Distribution plates 37 distribute the force contributions from the grids of springs 35 and end plates 36 to the pressure plates 38 and residence time sections in stack 41. The force on residence time sections may be measured by measuring the distance between one end plate 36 and how far indicator pins 40 have reached outside end plate 36.

Figure 13:
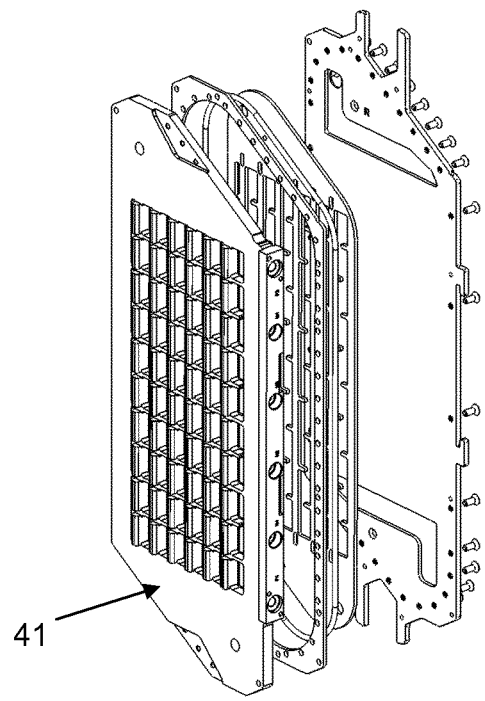
FIG. 13 shows one half of a flow plate which is dividable in midplane.

FIG. 13 shows a flow plate 41 which is dividable in midplane and comprises two parts, each part comprises a channel side and a utility side, the two parts of the flow plate are counter parts and mirroring each other. In FIG. 13, flow plate 41 is divided and one of the halves is seen from the channel side.

Figure 14:
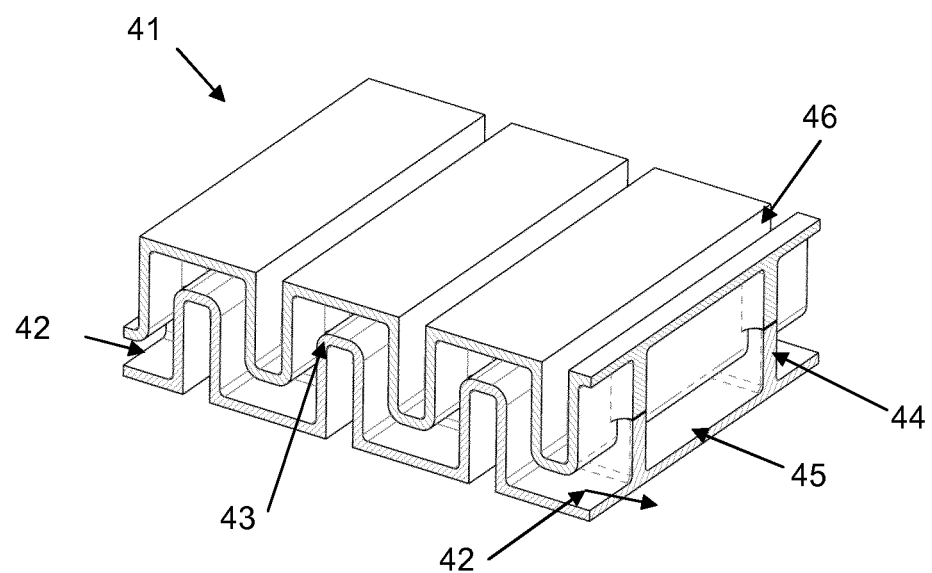
FIG. 14 shows a flow plate which is dividable in midplane.

FIG. 14 shows the two parts of flow plate 41. When the two parts are connected together, the two parts form a channel 42 between the two counter parting channel sides. Channel 42 comprises curved obstacles 43, sidewalls 44 and channel floors 45. The curved obstacles are lined up in parallel rows separated by sidewalls 44, the backside of the rows of curved obstacles have grooves 46 making the obstacles hollow for heat transfer fluids on the utility sides.

The invention claimed is:

1. A residence time plate comprising:
a stack of at least two substantially parallel and elongated flow chambers arranged such that the elongated side of each flow chamber lies next to the elongated side of a neighboring flow chamber and is separated from the neighboring chamber by a separation wall, wherein each separation wall has at least one through hole forming a communication between two neighboring flow chambers, and wherein said through holes are arranged in the separation walls on alternating sides of an imaginary central line drawn through the stack of flow chambers such that the flow direction in a flow chamber is along the extension of the flow chamber and opposite the flow direction of a neighboring chamber;
at least one liquid inlet and at least one liquid outlet arranged such that liquid flowing from said at least one liquid inlet to said at least one liquid outlet passes through the stack of flow chambers; and
at least one flow-path enhancing insert arranged in at least one flow chamber and thereby forming a number of insert flow passages in the flow chamber, wherein the number of insert flow passages are arranged such that liquid flowing in the flow chamber is directed through the insert flow passages, thereby forming a zigzag flow path along the flow direction of the flow chamber.

2. The residence time plate according to claim 1, wherein the zigzag flow path extends in more than one plane, thereby forming a three-dimensional zigzag flow path along the flow direction of the flow chamber.

3. The residence time plate according to claim 1, wherein at least some of the insert flow passages are formed between the at least one flow-path enhancing insert and any wall enclosing said flow chamber.

4. The residence time plate according to claim 3, wherein the at least one flow-path enhancing insert comprises rectangular or quadratic baffles forming a zigzag pattern, wherein each baffle has two first parallel edges and two second parallel edges and wherein said zigzag pattern is formed by a first parallel edge of a baffle meeting a first parallel edge of a neighboring baffle such that an angle is formed between the second parallel edges of the neighboring baffles, wherein said zigzag pattern extends along the direction of the elongated flow chamber such that said first edges are in contact with said separation walls, and wherein two neighboring baffles meet at first edges thereof at an offset, thereby forming an alternating pattern in which every second baffle is shifted in a first direction along said first edge and the baffles in between are shifted in the opposite direction along said first edge, thereby forming said insert passages between said second edges of the baffles any wall enclosing said flow chamber.

5. The residence time plate according to claim 1, wherein the at least one flow-path enhancing insert comprises insert flow passages therein.

6. The residence time plate according to claim 5, wherein the at least one flow-path enhancing insert further comprises baffles extending from the at least one flow-path enhancing insert at at least some insert flow passages.

7. The residence time plate according to claim 6, wherein the baffles and insert flow passages are arranged so as to guide the liquid in at least two different zigzag patterns along the flow direction of a flow chamber.

8. The residence time plate according to claim 7, wherein the at least two different zigzag patterns are intertwining.

9. The residence time plate according to claim 7, wherein the at least one flow-path enhancing insert comprises an elongated sheet with a number of insert flow passages arranged in a row along said elongated sheet, and wherein baffles extend from said elongated sheet at said insert flow passages alternatively from a first side of said elongated sheet and alternatively from a second side, which is opposite said first side, of said elongated sheet.

10. The residence time plate according to claim 6, wherein two baffles extend from each insert flow passage in opposite directions, and wherein the baffles are arranged such that the surface of the baffle is tilted relative the flow direction of the flow chamber.

11. The residence time plate according to claim 1, wherein the flow-path enhancing inserts are metallic foams or offset strip fin turbulators.

12. The residence time plate according to claim 1, wherein the flow-path enhancing inserts are coated with at least one catalyst.

13. The residence time plate according to claim 1, wherein the at least one through hole between flow chambers has a net for enhancing the mixing of a liquid passing said at least one through hole.

14. An assembled residence time section comprising the residence time plate according to claim 1 arranged between two utility plates, wherein the utility plates form two opposite walls of the flow chambers, and wherein said walls are perpendicular to the walls formed by the separation walls between the flow chambers.

15. The assembled residence time section according to claim 14, wherein at least one utility plate comprises a stack of a utility connection plate, a turbulator plate, a turbulator frame plate, an O-ring, a heat transfer plate and a utility frame plate.

16. The assembled residence time section according to claim 15, wherein the residence time plate is fitted in the utility frame plate and the heat transfer plate forms one of said opposite walls of the flow chambers.

17. A flow module comprising:
one or more of the assembled residence time sections according to claim 14; and
a clamping device, the clamping device comprising a frame and two end plates, said residence time sections being arranged between the end plates.

18. A plate reactor, comprising:
one or more of the assembled residence time sections according to claim 14; and
a clamping device, the clamping device comprising a frame and two end plates, said residence time sections being arranged between the end plates.

19. The residence time plate according to claim 1, wherein the at least one flow-path enhancing insert is a separate element from the separation walls.

20. The residence time plate according to claim 1, wherein each flow chamber is a rectangular passageway formed between adjacent separation walls, the rectangular passageway extending an entire length between the through holes formed in the separation walls, and wherein the at least one flow-path enhancing insert is a separate element from the separation walls.

* * * * *